Nov. 2, 1954    L. J. NEID    2,693,050
PIGEON TRAP
Filed Oct. 24, 1949    2 Sheets-Sheet 2
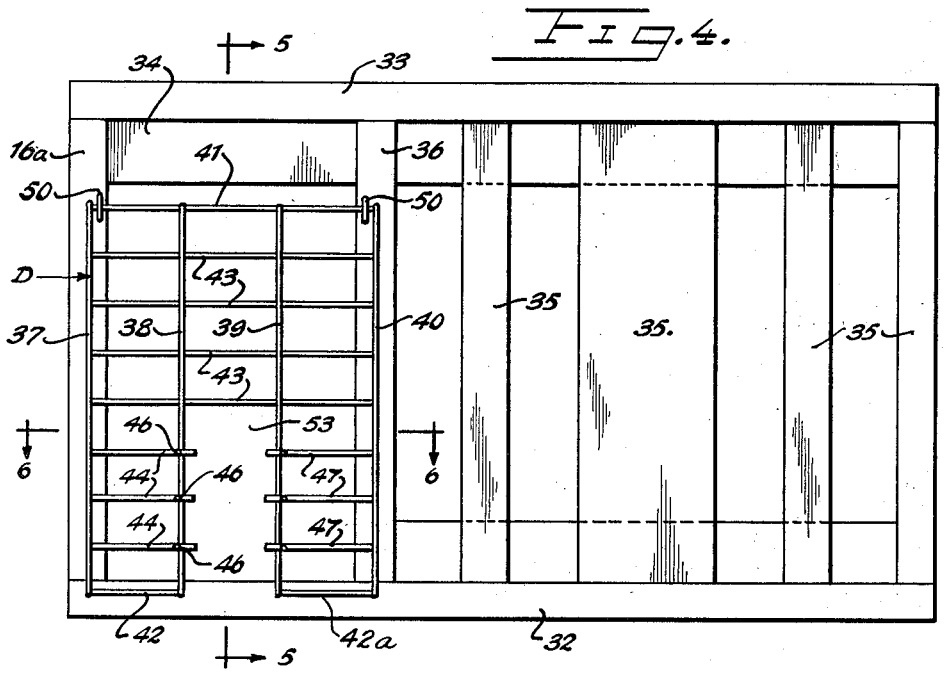
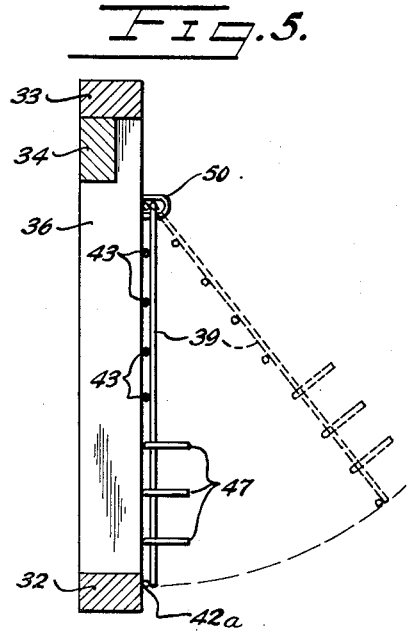
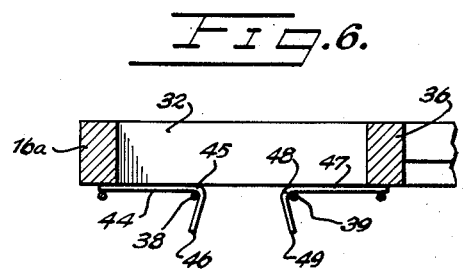
Inventor
LOUIS J. NEID.
By Thomas F. Healy
ATTORNEY

# United States Patent Office 2,693,050
Patented Nov. 2, 1954

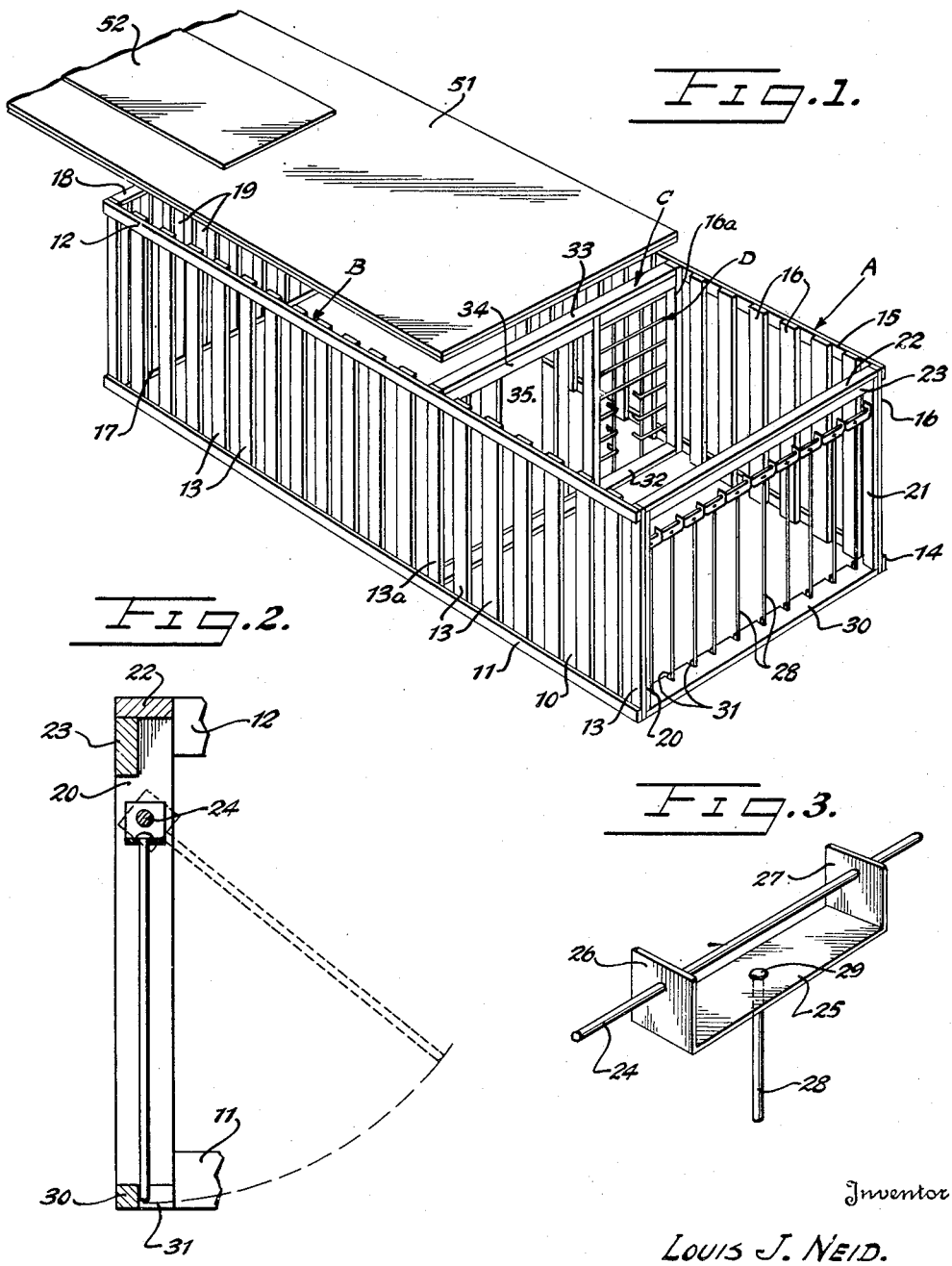

2,693,050

PIGEON TRAP

Louis J. Neid, St. Paul, Minn.

Application October 24, 1949, Serial No. 123,265

3 Claims. (Cl. 43—66)

The present invention relates to improvements in pigeon traps and has for an object to provide an improved device for trapping scrub pigeons alive.

The lodging of these common scrub pigeons on buildings and the like constitutes a nuisance and their dung causes great damage to the buildings and creates an unhealthy condition. Heretofore, poisoning and shooting of these birds and the erection of barriers on the infested buildings have been tried but these methods have proved unsuccessful. Accordingly, the present invention contemplates overcoming these disadvantages by providing an improved trap which may be located where the pigeons congregate and into which the birds are enticed and in which they are held captive in a live condition until released for proper and humane disposal.

The present invention also has for an object the provision of an improved structure in which the entrance gate is substantially as wide as the trap but an entering pigeon will displace only a portion of the gate so that birds already entrapped will not be able to escape when another pigeon is entering the device.

A further object of the present invention is to provide an improved trap which has a forward entrance or bait holding compartment and a rear or pigeon retaining compartment.

The present invention aims to provide an improved device of this kind which may be located on buildings without attracting public attention.

In one of its broadest aspects the present invention contemplates the provision of an improved trap comprising an entrance compartment or chamber, and an entrance gate thereto having a plurality of individual members capable of being moved inwardly of the compartment and stop means for limiting the outward and lateral movements of said members to prevent an entrapped pigeon from leaving said compartment.

With the foregoing and other objects in view, the invention will be hereinafter more fully described and more particularly pointed out in the appended claims.

In the drawings, in which the same parts are denoted by the same reference numerals throughout the several views:

Figure 1 is a perspective view of an improved pigeon trap constructed in accordance with the present invention and with the cover partly removed;

Figure 2 is a vertical sectional view of the entrance gate;

Figure 3 is an enlarged fragmentary detail view of the mounting for one of the swinging gate members;

Figure 4 is a rear elevational view of the partition between the forward and rear compartments;

Figure 5 is a vertical sectional view taken on the line 5—5 of Figure 4 and looking in the direction of the arrows; and Figure 6 is a horizontal sectional view taken on the line 6—6 of Figure 4 and looking in the direction of the arrows.

Referring more particularly to the drawings, 10 indicates a floor of the improved trap and 11 and 12 represent lower and upper longitudinally extending side rails which may be of metal, for example, some alloy of aluminum. Slats or palings 13 are attached by welding or the like to the inner faces of the rails 11 and 12 in spaced apart relation: the spaces between the slats being of such a width as to prevent a pigeon escaping therethrough. Lower and upper side rails 14 and 15 are similar to and are disposed in parallel spaced apart relation to the side rails 11 and 12. Slats or palings 16 are secured as by welding to the inner faces of the rails 14 and 15 in the same spaced apart relation as the slats 13 and 16. The floor 10 is secured, as by welding to the lower side rails 11 and 14.

The lower rails 11 and 14 are connected at their rear ends by a lower rear end rail 17 and the upper side rails 12 and 15 are connected by an upper rear end rail 18. Slats 19 have their lower end portions secured to the outer face of the rail 17 and their upper ends secured to the upper rear end rail 18, as by welding or the like.

The forward end of the trap is open and the foremost side slats of the slats 13 and 16 have secured thereto jambs 20 and 21, respectively, which are shorter than the slats 13 and 16 so that the upper and lower ends of the jambs 20 and 21 terminate short of the respective ends of the slats. A top rail 22 is secured to the inner faces of the foremost slats 13 and 16 and rests upon the upper ends of the jambs 20 and 21. A front piece or bracing member 23 extends between the jambs 20 and 21 and has its opposite ends secured to the inner faces of the jambs. A pivot rod 24 extends between the jambs 20 and 21 and is mounted on the upper end portions thereof.

A plurality of saddles are pivotally mounted on the rod 24 and each saddle is of substantially U-shape having a horizontally disposed body portion 25 and a pair of upstanding apertured spaced apart legs 26 and 27 which receive therethrough the rod 24. The body portion 25 of each saddle has a centrally disposed opening for the reception of a bar 28 which has an enlarged head 29 for abutting the upper surface of the body portion 25 adjacent the opening therein for maintaining the bar 28 in proper position upon the saddle. The length of the saddles is such that the bars 28 depending therefrom are so spaced apart that a pigeon cannot pass from the inside of the trap between two adjacent bars to the outside while the bars are in normal depending position.

The sill 30 is disposed in vertical alignment with the pivot rod 24 and the saddles and has in its rear edge portion a series of spaced apart notches 31 which correspond in number and are in alignment with the bars 28. The bars 28 are of sufficient length so that their lower end portions are received by the respective notches 31 of the sill 30 when the bars are in their normal closed position as shown in full lines in Figure 2 of the drawing.

The trap is divided into a forward entrance or bait holding compartment or chamber generally indicated at A and a rear compartment or chamber generally indicated at B by a partition generally indicated at C. The partition C has a sill 32, the opposite ends of which are secured to the inner faces of the lower end portions of intermediate slats 13a and 16a, respectively. The partition includes a top rail 33 which is disposed in vertically spaced apart relation to the sill 32 and has its opposite ends secured to the inner faces of the upper end portions of the slats 13a and 16a, respectively. A front piece 34 is disposed beneath the top rail 33 and has its opposite ends secured to the inner faces of the upper end portions of the slats 13a and 16a, respectively.

A series of slats 35 have their lower and upper end portions secured to the sill 32 and the top rail 33, respectively, and are spaced apart so that a pigeon cannot pass between two adjacent slats. At one end of the partition C a doorway is provided which is normally masked by a door generally indicated at D. The slat 16a constitutes one of the jambs of this doorway and the other jamb which is indicated at 36 is secured to the sill 32 and to the top rail 33 and the front piece 34. The door comprises parallel spaced apart rods 37, 38, 39 and 40 which are connected at their upper ends by a pivot pin 41. Rods 37 and 38 are connected at their lower ends by stop bar 42 and rods 39 and 40 are connected at their lower ends by stop bar 42a.

A series of vertically spaced apart braces 43 are connected to the rods 37, 38, 39 and 40 at points disposed above their medial lines.

A plurality of vertically spaced apart guards 44 have their outer ends secured to the rod 37 and their opposite free end portions are bent as at 45 and extend rearwardly and outwardly from this point 45 and terminate in points 46. The guards 44 have their bent portions 45 secured to the rod 38. Guards 47, similar in construction and arrangement to the guards 45, have their outer ends secured to the rod 40 and their opposite free end portions bent as at 48 and extend rearwardly and outwardly from this point 48 and terminate in points 49. The guards 47 have their bent portions 48 secured to the rod 39.

The gate D is pivotally mounted on the rear upper portions of the jambs 16a and 36 by staples 50, which engage the pivot pin 41 at its opposite end portions. The stop bars 42 engage the rear face of the sill 32 to check the forward swinging of the gate.

A cover 51 is disposed upon the trap and rests upon the upper rear end rail 18, the top rails 22 and 33. The cover 51 can be secured to these rails in any suitable manner. A lid 52 is mounted on the cover 51 and affords access to the interior of the trap.

In the operation of the trap it may be located in any suitable place where it is desired to eliminate the pigeons which have gathered there. A bait which may be in the form of food, not harmful in any way to bird life, but appealing to pigeons, is placed in the forward compartment A. This bait will attract the pigeon and in order to reach it, the pigeon will push against one or two of the bars 28 which will be freely swung inwardly on the pivot rod 24, as shown in dotted lines in Figure 2 of the drawing, until the pigeon is entirely within the compartment A. As soon as the bar or bars 28 are relieved of the force exerted by the pigeon they will return to their original vertical closed position with their lower end portions received by the notches 31 of the sill 30. The inner walls of the notches will check further forward swinging movement of the bars 28 to prevent the trapped pigeon from escaping by pushing the bars outwardly of the trap. The side walls of the notches will stop lateral movement of the bars 28 and thus preclude the possibility of the entrapped bird from pushing between two adjacent bars to escape. Since the bars 28 are individually mounted for independent swinging movement and only one or two of them need to be displaced by an entering pigeon, an entrapped bird cannot escape therefrom by himself. It is to be understood, however, that where a number of pigeons are simultaneously milling about within and without compartment A two or more of the individual bars 28 may be simultaneously displaced allowing some of the pigeons to pass in and out. Since those pigeons passing out establish confidence in the entire group, they, as well as others, will enter and serve as decoys for other pigeons.

During its movements within the forward compartment A, the entrapped pigeon will locate the door D and urged by its natural curiosity it will thrust its head and neck through the opening 53 of the door. Partial entrance will establish sufficient confidence in the bird to encourage him toward further effort. The body of the bird will then engage the guards 44 and 47 and further movement of the bird towards the door will cause the door to swing into the compartment B on the staples 50 to the dotted line position shown in Figure 5, until the pigeon is entirely within the chamber B. As soon as the bird moves out of engagement with the door, it will return automatically to its original vertical closed position. At this time, the stop bars 42 and 42a engage the rear face of the sill 32 to arrest the forward movement of the door D and to prevent the opening of the door into the compartment A. If a pigeon in compartment B attempts to pass through the opening 53 of the door into the compartment A, its body will contact the pointed ends 46 and 49 of the guards 44 and 47, respectively, and it will be discouraged from further attempts to pass through the opening. Moreover, the divergent rear end portions of the guards are so spaced apart that a pigeon cannot enter therebetween and the distance between the guards 44 and 47 decreases in a forward direction to further preclude the possibility of the pigeons moving from the compartment B to the compartment A.

One of the advantages of having two separate compartments with a door permitting a bird to leave the bait containing chamber but not being able to return thereto is that after entering the bait chamber and eating some of the bait, the entrapped bird will then leave the bait chamber and thus the bait will be conserved.

Another advantage inherent in this structure is that the previously entrapped birds will not remain in the bait compartment to trample and scatter the bait and to soil it with dung and the like, but new birds will be continuously entering, being decoyed by those presently in compartment A.

When the trap has become filled with pigeons, the trap can be emptied in situ or carried away to a suitable place for emptying. The birds may be removed from the trap by opening the lid 52 and withdrawing the pigeons through the opening in the cover 51. The cover 51 may be removably fitted to the trap to permit of access to both chambers A and B for cleaning and for rebaiting.

It is obvious that various changes and modifications may be made in the details of construction and design of the above specifically described embodiment of this invention without departing from the spirit thereof, such changes and modifications being restricted only by the scope of the following claims.

What I claim is:

1. An imprisoning trap for birds such as pigeons, comprising a confining structure having a floor, side walls and an end wall, said walls being comprised of horizontal top and bottom members and vertical intermediate spaced slats, a top covering the structure, a top rail extending transversely of and connecting the side walls at the opposite end of the structure from said end wall, a sill below said rail and connecting the side walls at the bottom thereof, the area between the rail and sill constituting an entrance opening, a pivot rod extending between and connecting said side walls and disposed in closely spaced relation to and parallel with the under side of said rail, a plurality of substantially U-shaped saddle members each having a straight central portion and parallel end legs, said legs being apertured and having said pivot rod passing therethrough, the saddles being in end to end leg abutting relation across the width of the opening whereby endwise movement of the saddle members on the rod is prevented but swinging movement is permitted, the central portion of each saddle having an aperture therethrough, a straight headed bar extending through each saddle aperture and suspended by its head therefrom, said pivot rod lying in a vertical plane passing through and longitudinally of the sill, the inner side of the sill having a plurality of notches therein corresponding in number to the bars, each of said bars being freely swingable inwardly only independently of the others and having its lower end received in a notch when hanging freely from the pivot rod, a partition within and transversely of the structure dividing the latter into a forward compartment into which said bars swing and a rearward compartment, a door opening in said partition, and a door pivotally suspended to cover said door opening on the rearward compartment side of the partition and swingable only into the rearward compartment.

2. The invention according to claim 1 wherein said door is of open construction and comprises two adjacent vertical transversely spaced central rod members and vertical side rod members spaced from the central members and horizontal rod members, the horizontal rod members through approximately the lower half of the door extending only from the side members to and terminating at the adjacent central rod members whereby to provide an opening between the central rod members, and pointed elements carried by the central rod members at each side of the opening therebetween and extending into the rearward compartment, the elements at the two sides of the opening being in divergent relation.

3. The invention according to claim 2 wherein said pointed elements constitute continuations of the said lower horizontal rod members extending around the central rod members.

References Cited in the file of this patent

UNITED STATES PATENTS

| Number | Name | Date |
|---|---|---|
| 521,053 | Seaton | June 5, 1894 |
| 524,425 | Morton | Aug. 14, 1894 |
| 910,000 | Hendrix | Jan. 19, 1909 |

(Other references on following page)

UNITED STATES PATENTS

| Number | Name | Date |
|---|---|---|
| 1,103,819 | Nystrom | July 14, 1914 |
| 1,497,883 | Sosbee | June 17, 1934 |
| 2,065,416 | Albert | Dec. 22, 1936 |
| 2,178,789 | Heath | Nov. 7, 1939 |
| 2,478,883 | Willis et al. | Aug. 9, 1949 |
| 2,518,614 | Hain | Aug. 15, 1950 |

FOREIGN PATENTS

| Number | Country | Date |
|---|---|---|
| 504,145 | Great Britain | Apr. 20, 1939 |